(12) United States Patent
Schellstede

(10) Patent No.: US 9,062,651 B2
(45) Date of Patent: Jun. 23, 2015

(54) OFFSHORE WIND POWER SYSTEM

(75) Inventor: Herman J. Schellstede, New Iberia, LA (US)

(73) Assignee: GRANT VENT POWER LLC, Lake Charles, LA (US)

( * ) Notice: Subject to any disclaimer, the term of this patent is extended or adjusted under 35 U.S.C. 154(b) by 870 days.

(21) Appl. No.: 13/223,987

(22) Filed: Sep. 1, 2011

(65) Prior Publication Data

US 2012/0057979 A1    Mar. 8, 2012

Related U.S. Application Data

(60) Provisional application No. 61/379,904, filed on Sep. 3, 2010.

(51) Int. Cl.
| | |
|---|---|
| *F03D 9/00* | (2006.01) |
| *F03D 1/00* | (2006.01) |
| *F03D 7/02* | (2006.01) |

(Continued)

(52) U.S. Cl.
CPC ................ *F03D 1/001* (2013.01); *F03D 1/003* (2013.01); *F03D 7/0268* (2013.01); *F03D 11/04* (2013.01); *Y02E 10/723* (2013.01); *Y02E 10/728* (2013.01); *E02B 17/0034* (2013.01); *E02B 17/027* (2013.01); *E02B 17/0818* (2013.01); *E02B 2017/006* (2013.01); *E02B 2017/0091* (2013.01)

(58) Field of Classification Search
CPC ........... F03D 9/00; F03D 7/02; F03D 7/0264; F03D 7/0268; F03D 1/001; F03D 1/003; F03D 11/04; F01D 7/00; E02B 17/027; E02B 17/0818

USPC ...... 416/169 R, 142, 143, 140, 132 R, 244 R; 290/44, 55

See application file for complete search history.

(56) References Cited

U.S. PATENT DOCUMENTS

| | | | |
|---|---|---|---|
| 7,238,009 | B2 | 7/2007 | Schellstede |
| 2007/0160473 | A1 | 7/2007 | Arel |

(Continued)

FOREIGN PATENT DOCUMENTS

| | | |
|---|---|---|
| WO | 2006005323 | 1/2006 |
| WO | 2008032281 | 3/2008 |

OTHER PUBLICATIONS

International Search Report for International Patent Application No. PCT/US2011/050307, European Patent Office, dated Dec. 20, 2011.

(Continued)

*Primary Examiner* — Edward Look
*Assistant Examiner* — Maxime Adjagbe
(74) *Attorney, Agent, or Firm* — Locke Lord LLP

(57) ABSTRACT

A wind power system comprising a vertical tower defining a vertical travel path; a carriage mounted to the tower and configured to move along the travel path; and wind turbine mounted to the carriage and having rotatable blades to convert wind energy into electrical energy. The system may include one or more gear racks secured to the outside diameter of the tower upon which the carriage moves. The system may include a locking mechanism configured to lock the carriage in a working position at a top of the travel path, a maintenance position at a bottom of the travel path, and/or a storm position at a midpoint of the travel path. The turbine may be configured to hold the blades in a vertical alignment parallel to the tower, when the carriage is in the storm position.

16 Claims, 11 Drawing Sheets

(51) Int. Cl.
*F03D 11/04* (2006.01)
*E02B 17/00* (2006.01)
*E02B 17/02* (2006.01)
*E02B 17/08* (2006.01)

(56) References Cited

U.S. PATENT DOCUMENTS

2007/0243063 A1 10/2007 Schellstede
2008/0011689 A1* 1/2008 Gordon .................... 210/747
2008/0131279 A1* 6/2008 Behnke et al. ............ 416/26
2009/0087311 A1 4/2009 Wyborn

OTHER PUBLICATIONS

Written Opinion for International Patent Application No. PCT/US2011/050307, European Patent Office, dated Dec. 20, 2011.

* cited by examiner

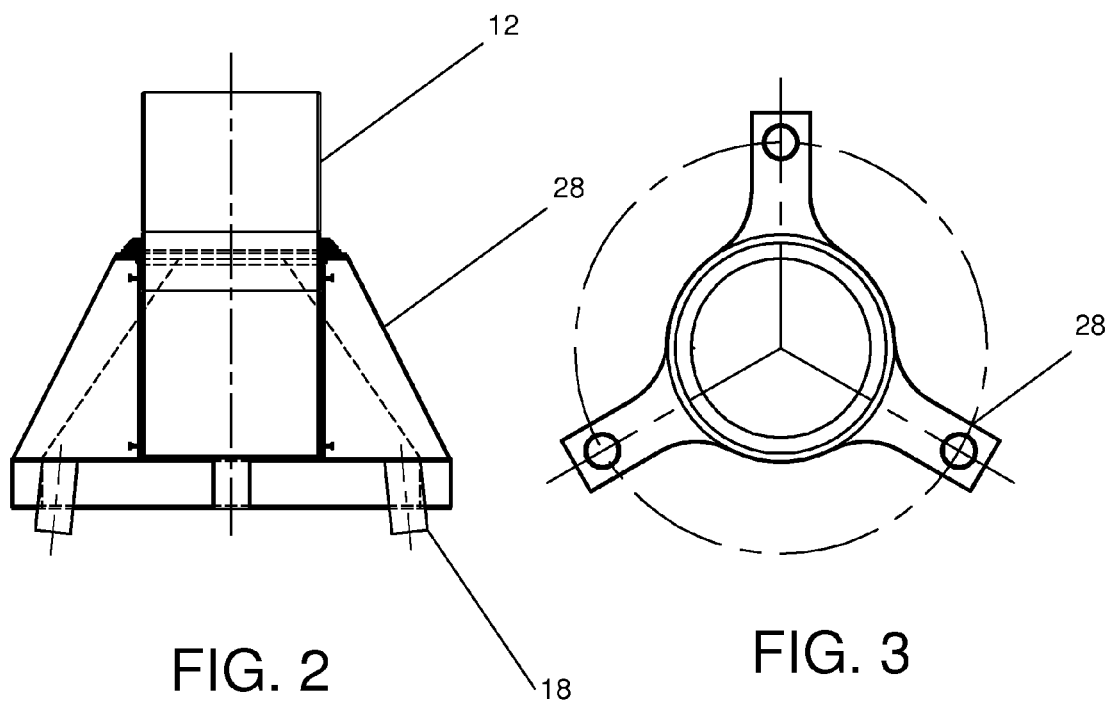

OFFSHORE WIND POWER SYSTEM

CROSS REFERENCE TO RELATED APPLICATIONS

The application is a non-provisional, and claims priority benefit, of U.S. Patent Application Ser. No. 61/379,904, filed Sep. 3, 2010, which is incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to wind driven power generation systems; and more specifically relate to wind turbine systems for use offshore.

2. Description of the Related Art

U.S. Pat. No. 7,238,009 discloses "offshore windmill generators. The invention involves inserting an adapter between the nacelle of the windmill and the tower, which includes either a leveling device or a vibration dampening device, or both."

U.S. Patent Application Publication No. 20070243063 discloses "structures and methods for elevating and retracting offshore wind turbine assemblies. Structures and methods are presented for elevating and retracting offshore wind turbine assemblies mounted on a tower in order to facilitate both service of the assemblies at any time, as well as preservation of the assemblies through storms or other high-wind weather events. Among the structures presented are folding wind turbine blades that may be folded into compact clusters and secured to braces in order to minimize damage during storms or other high-wind events."

The inventions disclosed and taught herein are directed to an improved system for offshore wind power generation.

BRIEF SUMMARY OF THE INVENTION

A wind power system comprising a vertical tower defining a vertical travel path, the tower having a constant outside diameter along the travel path; a carriage mounted to the tower and configured to move along the travel path; and wind turbine mounted to the carriage and having rotatable blades to convert wind energy into electrical energy. In some embodiments, the carriage surrounds the tower. The system may include one or more gear racks secured to the outside diameter of the tower along the travel path, with the carriage having an electric motor driving a pinion gear that meshes with the gear rack to move the carriage along the travel path. The electric motors may be powered by alternating current supplied by a separate support vessel. The system may include electrically operated brakes configured to hold the carriage position along the travel path. The system may include a locking mechanism configured to lock the carriage in a working position at a top of the travel path. In some embodiments, the locking mechanism comprises a sleeve secured to the carriage and a outwardly biased peg configured to fit into an internal opening in the sleeve, thereby locking the carriage at the top of the travel path. The carriage may be electrically coupled with a power cable located inside the tower when in a working position at a top of the travel path of the tower. The carriage may also be electrically decoupled with the power cable when the carriage is not in the working position. The tower may have a variable internal diameter, with a wall of the tower being thinner near the top of the tower than near a bottom of the tower. The carriage preferably rotates about the tower in order to align the wind turbine with a wind direction. The system may include a locking mechanism configured to lock the carriage in a maintenance position at a bottom of the travel path. The system may also include a locking mechanism configured to lock the carriage in a storm position at a midpoint of the travel path. The turbine may be configured to hold the blades in a vertical alignment parallel to the tower, when the carriage is in the storm position.

BRIEF DESCRIPTION OF THE SEVERAL VIEWS OF THE DRAWINGS

FIG. 2 illustrates an elevation view of a transition that may be used to secure a tower to a jacket of the system of FIG. 1;

FIG. 3 illustrates a plan view of the transition of FIG. 2;

DETAILED DESCRIPTION OF THE INVENTION

Figure 1:
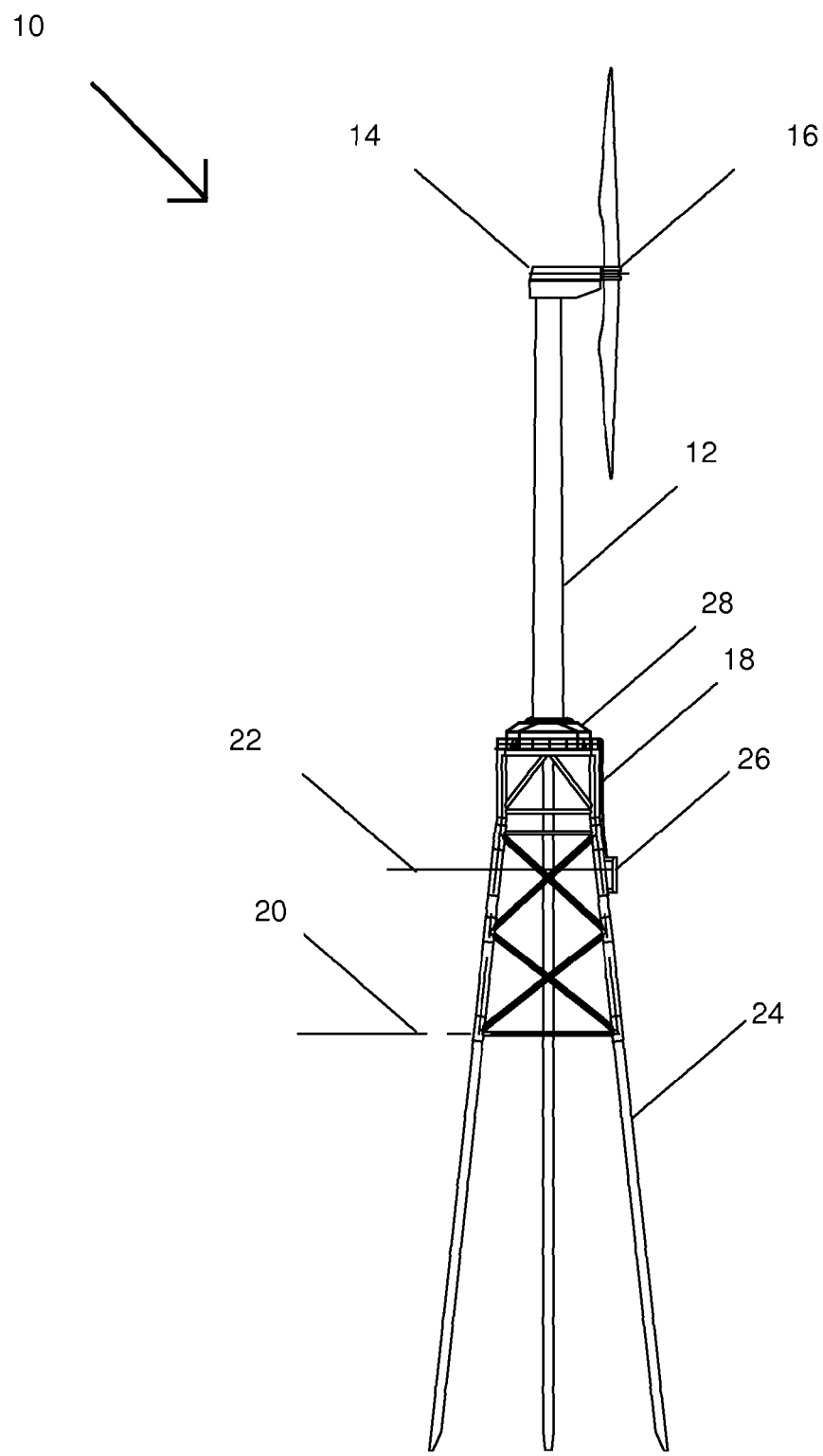
FIG. 1 illustrates a particular embodiment of a wind power system utilizing certain aspects of the present inventions.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Applicants have created a wind power system comprising a vertical tower defining a vertical travel path, the tower having a constant outside diameter along the travel path; a carriage mounted to the tower and configured to move along the travel path; and wind turbine mounted to the carriage and having rotatable blades to convert wind energy into electrical energy. In some embodiments, the carriage surrounds the tower. The system may include one or more gear racks secured to the outside diameter of the tower along the travel path, with the carriage having an electric motor driving a pinion gear that meshes with the gear rack to move the carriage along the travel path. The electric motors may be powered by alternating current supplied by a separate support vessel. The system may include electrically operated brakes configured to hold the carriage position along the travel path. The system may include a locking mechanism configured to lock the carriage in a working position at a top of the travel path. In some embodiments, the locking mechanism comprises a sleeve secured to the carriage and a outwardly biased peg configured to fit into an internal opening in the sleeve, thereby locking the carriage at the top of the travel path. The carriage may be electrically coupled with a power cable located inside the tower when in a working position at a top of the travel path of the tower. The carriage may also be electrically decoupled with the power cable when the carriage is not in the working position. The tower may have a variable internal diameter, with a wall of the tower being thinner near the top of the tower than near a bottom of the tower. The carriage preferably rotates about the tower in order to align the wind turbine with a wind direction. The system may include a locking mechanism configured to lock the carriage in a maintenance position at a bottom of the travel path. The system may also include a locking mechanism configured to lock the carriage in a storm position at a midpoint of the travel path. The turbine may be configured to hold the blades in a vertical alignment parallel to the tower, when the carriage is in the storm position.

FIG. 1 is an illustration of a wind power system 10 according to the present invention. The system 10 includes a vertical tower 12 supporting a carriage 14, which in turn supports a wind turbine 16. The tower 12 is preferably mounted to jacket 18. The jacket 18 preferably extends from a seabed 20 above a water level 22 and is preferably supported by a plurality of, three as shown, piles 24 driven into the seabed 20.

The jacket 18 and piles 24 may be substantially conventional and are preferably constructed of welded steel with cross-members, as needed. Rather than customary paint, the jacket 18 is preferably covered in an epoxy coating to prevent corrosion. The jacket 18 may also include a dock 26 or other structure to which a work boat may be secured and/or to facilitate transferring men and/or material to and from the jacket 18, which may also include one or more decks, walkways, and/or workspaces.

Referring also to FIG. 2 and FIG. 3, the tower 12 is preferably mounted to the jacket 18 with a transition, or socket, 28. The transition 28 is preferably welded atop the jacket 18. The tower 12 is preferable fitted inside the transition 28, and may be welded, bolted, and/or otherwise affixed therein, such as through the use of an adhesive.

Figure 4:
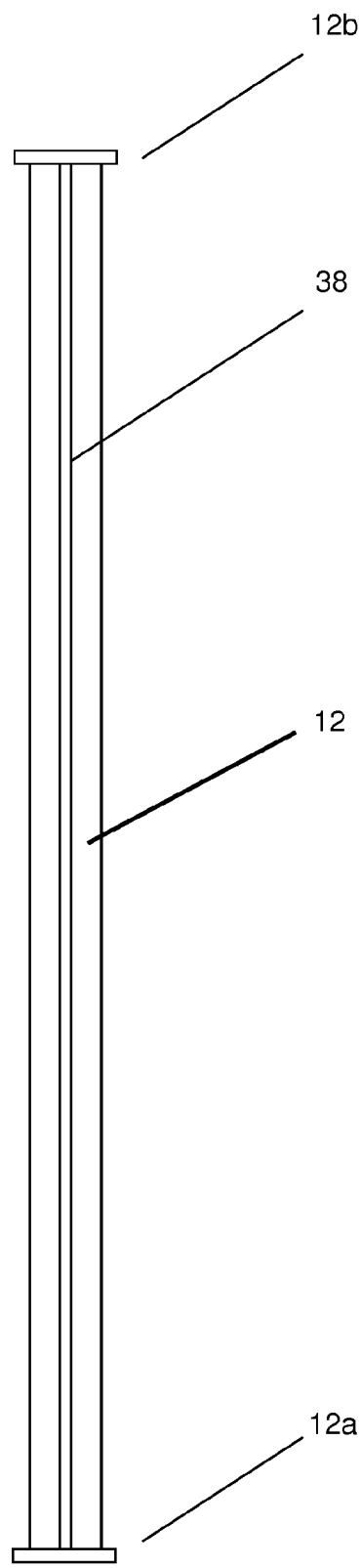
FIG. 4 illustrates an elevation view of a tower that may be used with the system of FIG. 1.
Figure 5:
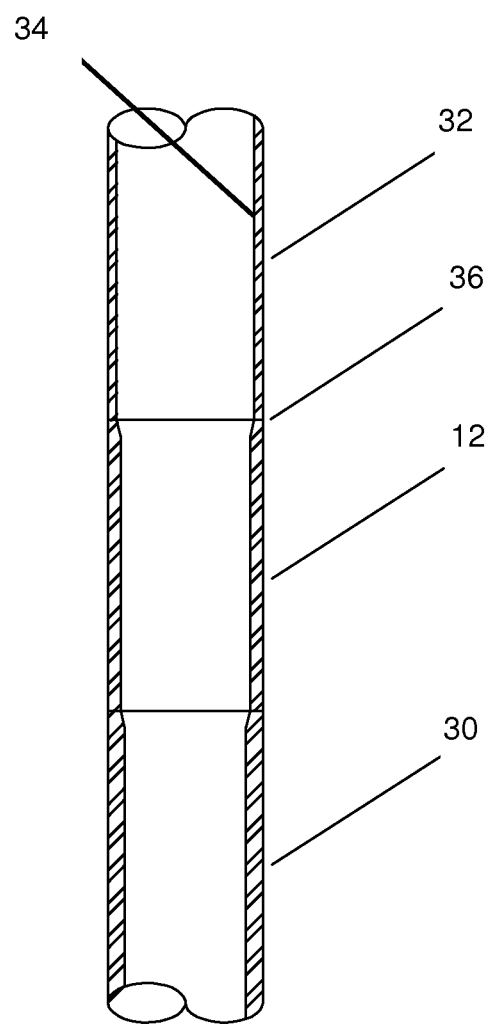
FIG. 5 illustrates an elevation sectional view of the tower of FIG. 4.

Referring also to FIG. 4 and FIG. 5, the tower 12 preferably has a constant outer diameter 30 which defines a vertical travel path for the carriage 14. In one embodiment, the vertical travel path extends all the way from a bottom portion 12*a*, where the tower 12 mates to the jacket 18, to a top portion 12*b*. It will be appreciated that the tower 12 needs to be stronger at a base, near the bottom portion, than at the top portion. Further, it may be advantageous for the tower 12 to be lighter at the top portion than at the bottom portion. Therefore, the tower 12 may have a variable thickness 32 and/or internal diameter 34 along its length and/or the travel path. As shown, the tower's 12 internal diameter may outward steps 36 at various sections of the tower 12 to provide this variable thickness and/or internal diameter. As shown, those outward steps 36 may be smooth, continuous transitions. Alternatively, the outward steps 36 may be discontinuous, abrupt transitions. In still other embodiments, variable thickness and/or internal diameter is provided by a smooth, continuous taper along the length and/or the travel path of the tower 12.

Figures 6, 6A:
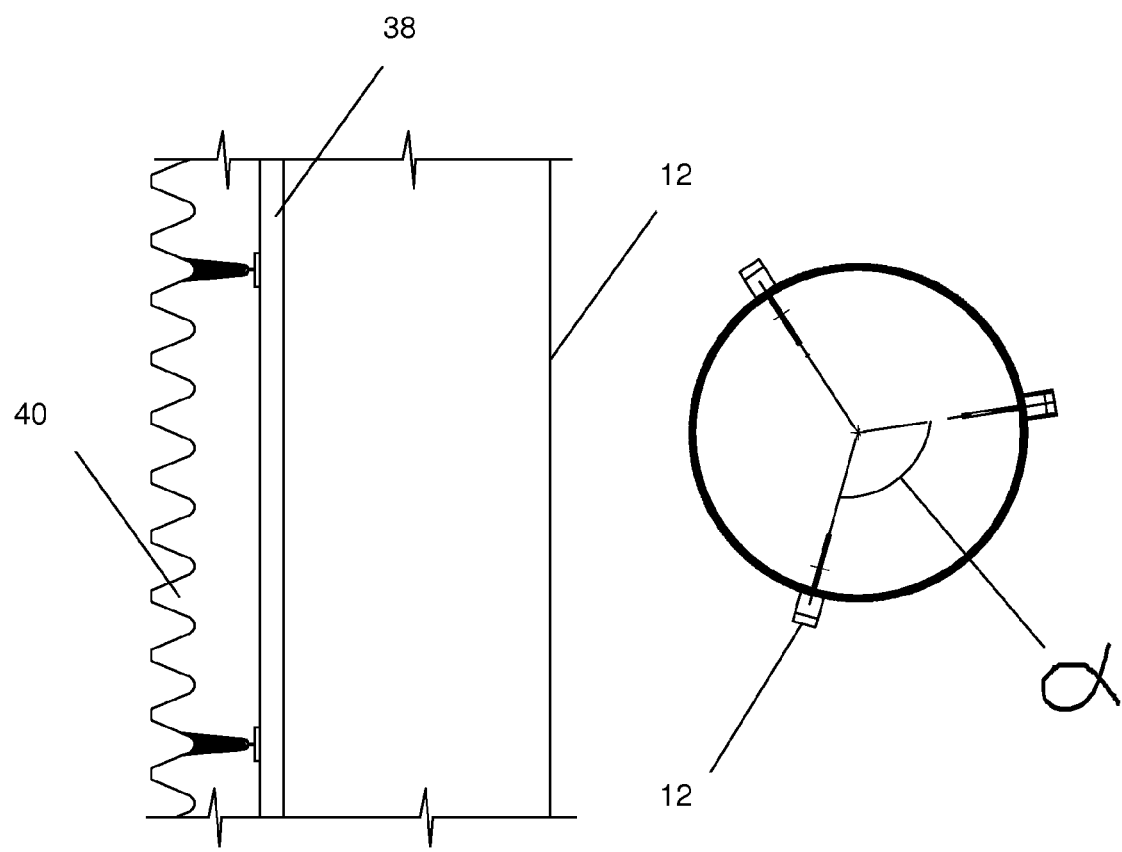
FIG. 6 illustrates a partial elevation sectional view of the tower of FIG. 4, showing a gear rack utilizing certain aspects of the present inventions.
FIG. 6A illustrates a plan view of the tower of FIG. 6.

Referring also to FIG. 6 and FIG. 6A, the tower 12 preferably has one or more gear racks 38 mounted thereto. In the embodiment shown, the tower 12 has three gear racks 38 mounted thereto, around a circumference of the tower 12. Where there are multiple gear racks 38, they may be uniformly spaced around the circumference of the tower 12. For example, where there are three gear racks 38, they may be spaced around the circumference of the tower 12 at an angle α of approximately one hundred and twenty degrees. Alternatively, the gear racks 38 may be non-uniformly spaced around the circumference of the tower 12.

Figure 7:
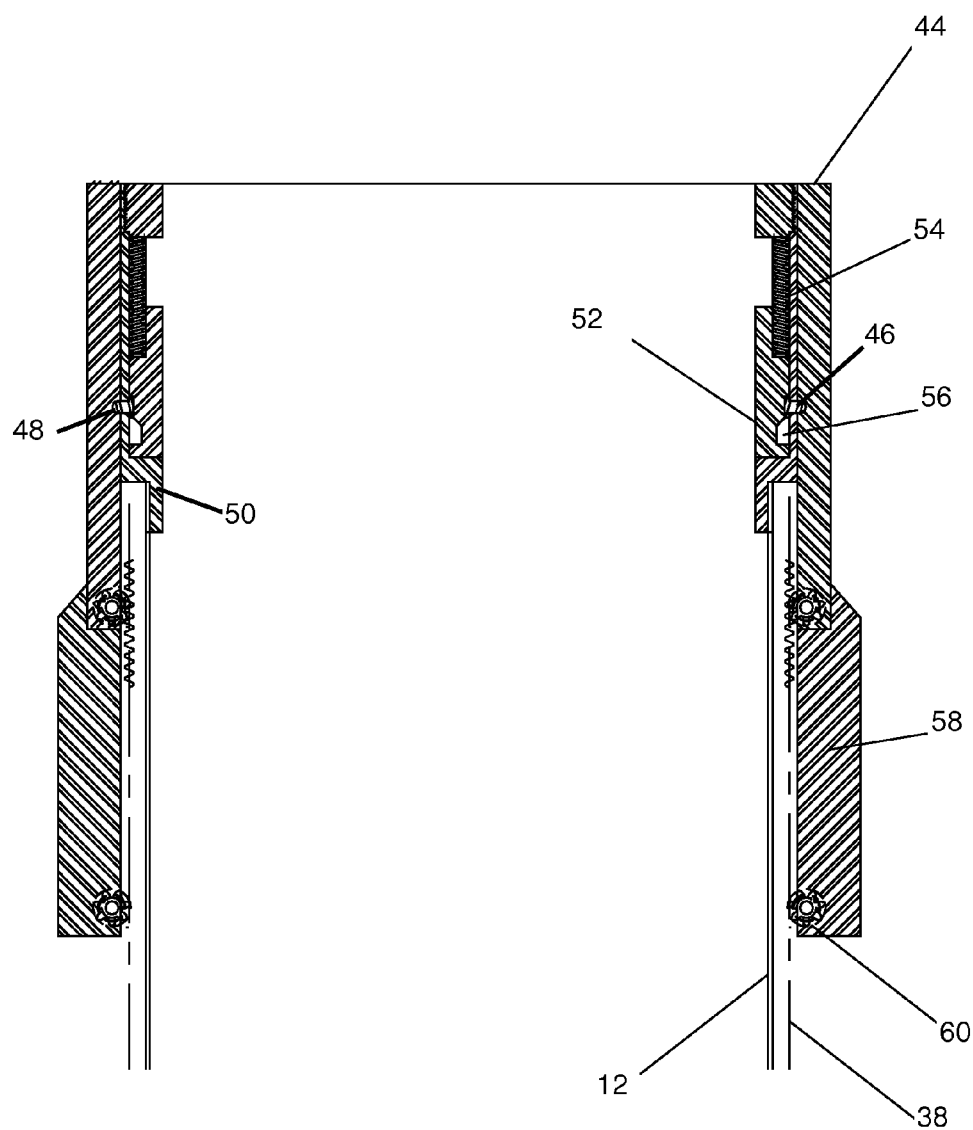
FIG. 7 illustrates a sectional view of a locking mechanism utilizing certain aspects of the present inventions.

As shown, the gear racks 38 have a series of teeth 40 upon which the carriage 14 rides along the vertical travel path. Referring also to FIG. 7, the system 10 may include one or more locking mechanisms 42 to hold, or lock, the carriage 14 in position along the travel path. In one embodiment, the locking mechanisms 42 include a sleeve 44 secured to the carriage 14 and configured to move along the travel path with the carriage 14. The locking mechanisms 42 may also include an outwardly biased peg 46 configured to fit into an internal opening 48 in the sleeve 44, thereby locking the carriage 14 in position along the travel path.

Figure 8:
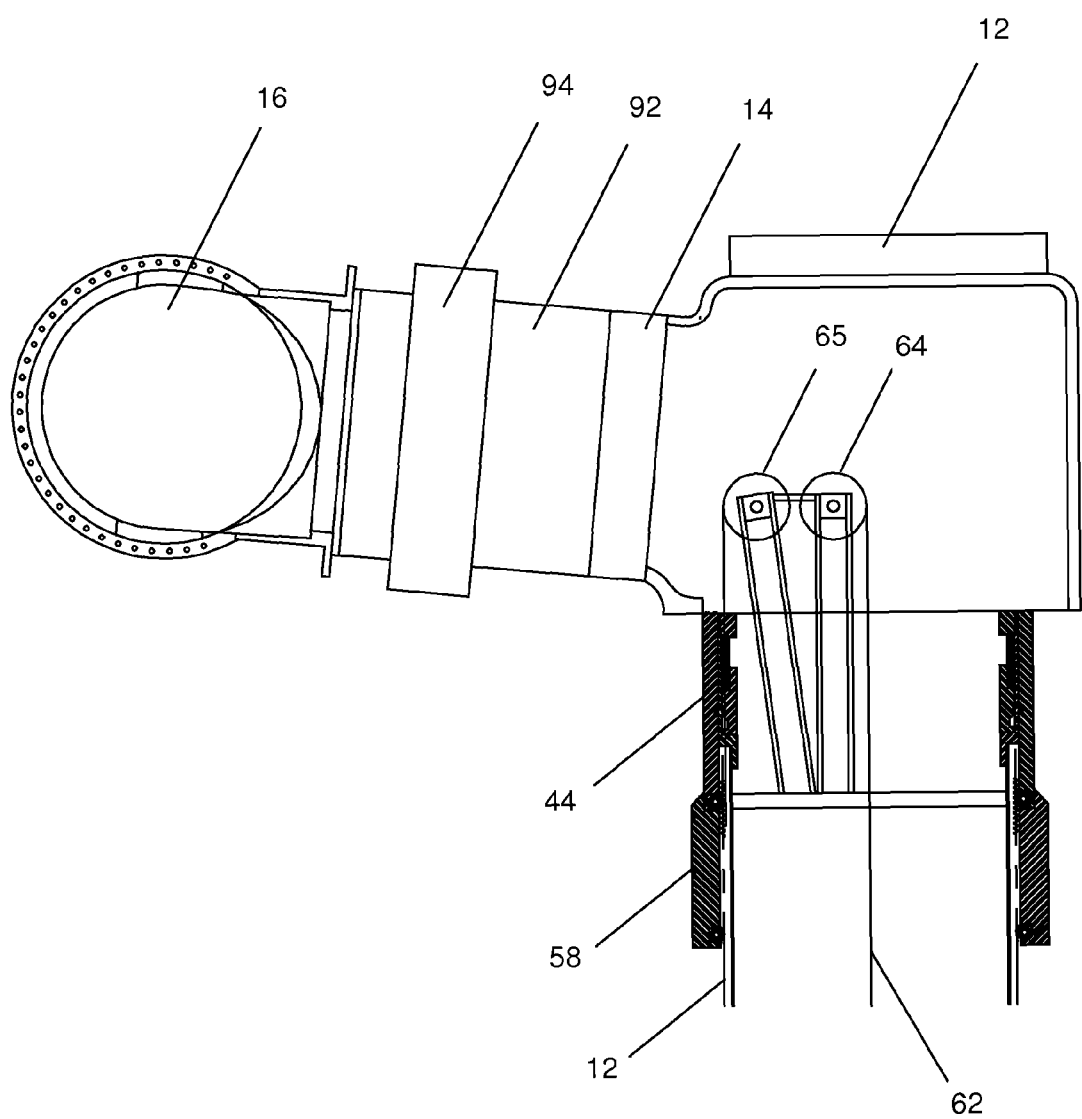
FIG. 8 illustrates a carriage assembly FIG. 10 utilizing certain aspects of the present inventions.

The peg 46 may comprise a cylindrical and/or spherical member and may be held in place by a retaining member 50. The retaining member 50 may be secured to the tower 12 adjacent or offset from the gear rack(s) 38. The peg 46 may be outwardly biased by a spring and/or a cam member 52 that selectively slides relative to the retaining member 50. If used, the cam member 52 may be biased by spring or gear system 54 to slide relative the peg, thereby outwardly biasing the peg 46. The gear system 54 may be electrically and/or remotely driven, such that the locking mechanism(s) 42 may be remotely operated and/or selectively engaged, thereby remotely locking the carriage 14 in position along the travel path. The locking mechanism(s) 42 may include an inward pocket 56 for the peg 46 to be retracted into, when not engaged, either by a spring or another mechanical influence. Referring also to FIG. 8, where the cam member 52 is biased by a spring 54 to slide relative the peg 46, the cam member 52 may be slid against, and compressing, the spring 54 using a mechanical cable and pulley system which is operable from below, or near the base of the tower 12. As shown, pulling the cable slides the cam member 52 upwardly, thereby allowing the peg 46 to retract, or be retracted, into the inward pocket 56 and allowing the carriage 14 to move along the travel path and/or about the tower 12. The cable may be pulled manually. Alternatively, the cable may be pulled, or the cam member 52 otherwise actuated, or using direct current, and thereby run off of the energy generated and/or stored from the wind turbine 16, or alternating current, which may be supplied through an inverter or a separate source, such as a support vessel.

The internal opening 48 in the sleeve 44 preferably comprises a groove along an interior surface or circumference of the sleeve 44, thereby allowing the carriage 14 to rotate about the tower 12, when locked in position along the travel path. Alternatively, the internal opening 48 may comprise one or more discrete openings in the interior surface or circumference of the sleeve 44, thereby simultaneously locking the carriage 14 in position along the travel path and with respect to the circumference of the tower 12.

The carriage 14 may also include a motor housing 58 to house one or more motor driven gears 60, such as pinion gears, to mesh with the gear rack(s) 38 in order to move the carriage 14 along the travel path. In one embodiment, the system 10 includes motor driven gears 60, with two on each of three gear racks 38. The motor drive gears 60 may be direct current powered, and thereby run off of the energy generated and/or stored from the wind turbine 16. Alternatively, the motor drive gears 60 may be alternating current powered, which may be supplied through an inverter or a separate source, such as the support vessel.

The motor driven gears 60 preferably include electrically actuated or de-actuated brakes to selectively hold the carriage 14 in position along the travel path. In one embodiment, the brakes of the motor driven gears 60 are electrically de-actuated in other to move the carriage 14 along the travel path. Such electrically de-actuated brakes may be powered internally or externally, such as from the support vessel and/or allow the carriage 14 to hold position along the travel path without energy loss.

Figures 9, 10, 11:
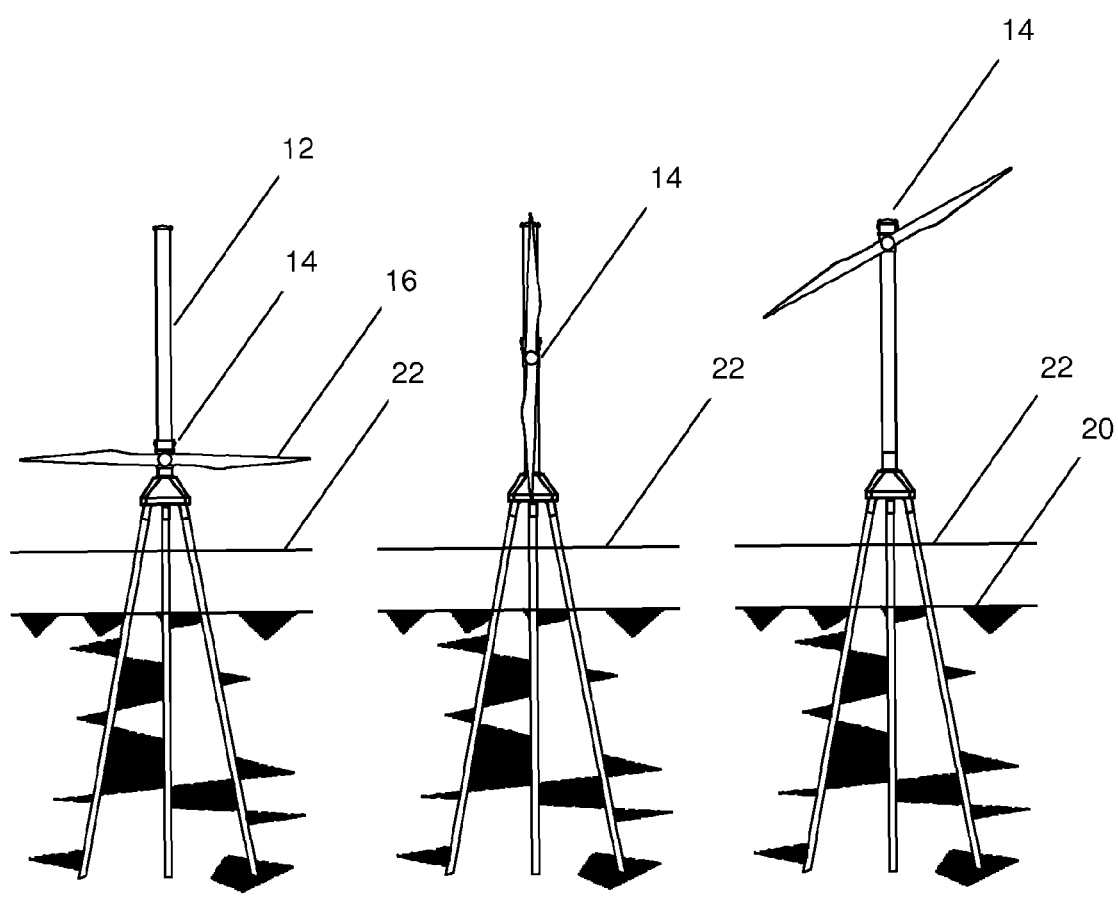
FIG. 9 illustrates the system of FIG. 1, with a carriage in a maintenance position with respect to a tower according to certain aspects of the present inventions.
FIG. 10 illustrates the system of FIG. 1, with a carriage in a storm position with respect to a tower according to certain aspects of the present inventions.
FIG. 11 illustrates the system of FIG. 1, with a carriage in a working position with respect to a tower according to certain aspects of the present inventions.

Referring also the FIG. 9, FIG. 10, and FIG. 11, the system 10 is preferably with three modes, with each having an associated position for the carriage 14 along the travel path. A maintenance position, as shown in FIG. 9, comprises the carriage 14 being located near a bottom of the travel path. In this maintenance position, the carriage 14 is easily accessible to a support vessel, as will be discussed in greater detail below. The maintenance position is preferably used to install components of the system 10 and/or perform maintenance on components of the system 10. Because of the proximity of the carriage 14 to the water level 22, the blades of the wind turbine 16 are preferably locked in a horizontal orientation, which is about parallel to the water level 22 and about perpendicular to the tower 12. It can be seen that if the blades of the wind turbine 16 were in a vertical orientation, which is about perpendicular to the water level 22 and about parallel to the tower 12, at least one of the blades could be partially below the water level 22.

A storm position, as shown in FIG. 10, comprises the carriage 14 being located near a midpoint of the travel path. In this storm position, the carriage 14 is well above the water line 22, thereby keeping the carriage 14 away from any waves and/or storm surge. The blades of the wind turbine 16 are also preferably well above the water line 22, thereby keeping the blades of the wind turbine 16 away from any waves and/or storm surge. In this storm position, the blades of the wind turbine 16 are also preferably in the vertical orientation, which is about perpendicular to the water level 22 and about parallel to the tower 12, with the system 10 thereby presenting the least possible profile to any wind and/or waves. In this storm position, the carriage 14 may be rotated about the tower 12 to face the wind turbine 16 into the wind and/or waves, such that the tower 12 prevent excessive deflection of the blades of the wind turbine 16. Alternatively, the carriage 14 may be rotated about the tower 12 to face the wind turbine 16 away from the wind and/or waves, such that the tower 12 shields the blades of the wind turbine 16.

A working position, as shown in FIG. 11, comprises the carriage 14 being located near a top of the travel path. In this working position, the carriage 14 is preferably rotated about the tower 12 to face the wind turbine 16 into the wind, with the blade of the wind turbine 16 preferably freed to rotate, driven by the wind, and thereby generate electrical energy, which may be stored in batteries and later and/or immediately be transferred via a subsea cable. Referring also the FIG. 8, when in the working position, the carriage 14, and/or wind turbine 16 itself may be electrically coupled with a power cable assembly 62 located inside the tower 12. The blades of the wind turbine 16 may be rotatably secured to a generator assembly 92 through a bearing 94.

The carriage 14, and/or wind turbine 16 itself may be electrically decoupled with the power cable 62 when the carriage 14 is not in the working position. Alternatively, the cable 62, or a portion thereof may be suspended on a pulley assembly, and thereby travel with the carriage 14 along the travel path. More specifically, a first pulley 64 may support the weight of that portion of the cable 62 that is vertically suspended inside the tower 12. A second pulley 65 may support the weight of that portion of the cable 62 that is vertically suspended outside of the tower 12. The first pulley 64 and/or the second pulley 65 may be configured to retract that portion of the cable 62 that is vertically suspended outside of the tower 12, as the carriage 14 rises toward the top 12b of the tower 12. This power cable assembly 62 may include cabling the communicate the electrical energy generated by the wind turbine 16 and/or control the motor driven gears 60, electrically operated brakes, and/or other components of the carriage 14 and/or locking mechanism 42.

There may be complete and/or partial locking mechanisms 42 located to lock or hold the carriage 14 in any or all of the positions along the travel path. For example, there may be a locking mechanism 42 near the top of the tower 12 to hold the carriage 14 in the working position. This locking mechanism 42 near the top of the tower 12 preferably allows the carriage 14 to freely move about the tower 12 to keep the wind turbine 16 properly oriented with any shifting wind, while preventing the carriage 14 from moving along the travel path. A connector may be incorporated in the locking mechanism 42 near the top of the tower 12 to connect the carriage 14 and or wind turbine 16 with the power cable 62, when the carriage 14 is in the working position.

There may also be a locking mechanism 42 near the midpoint of the tower 12 to hold the carriage 14 in the storm position. This locking mechanism 42 near the midpoint of the tower 12 preferably allows the carriage 14 to freely move about the tower 12 to keep the wind turbine 16 properly oriented with respect to any wind and/or waves, while preventing the carriage 14 from moving along the travel path.

There may also be a locking mechanism 42 near the bottom of the tower 12 to hold the carriage 14 in the maintenance position. This locking mechanism 42 near the bottom of the tower 12 preferably pins, locks, or otherwise prevents the carriage 14 from moving about the tower 12 and preventing the carriage 14 from moving along the travel path, thereby keeping the wind turbine 16 properly oriented with respect to any support vessel.

Figure 12:
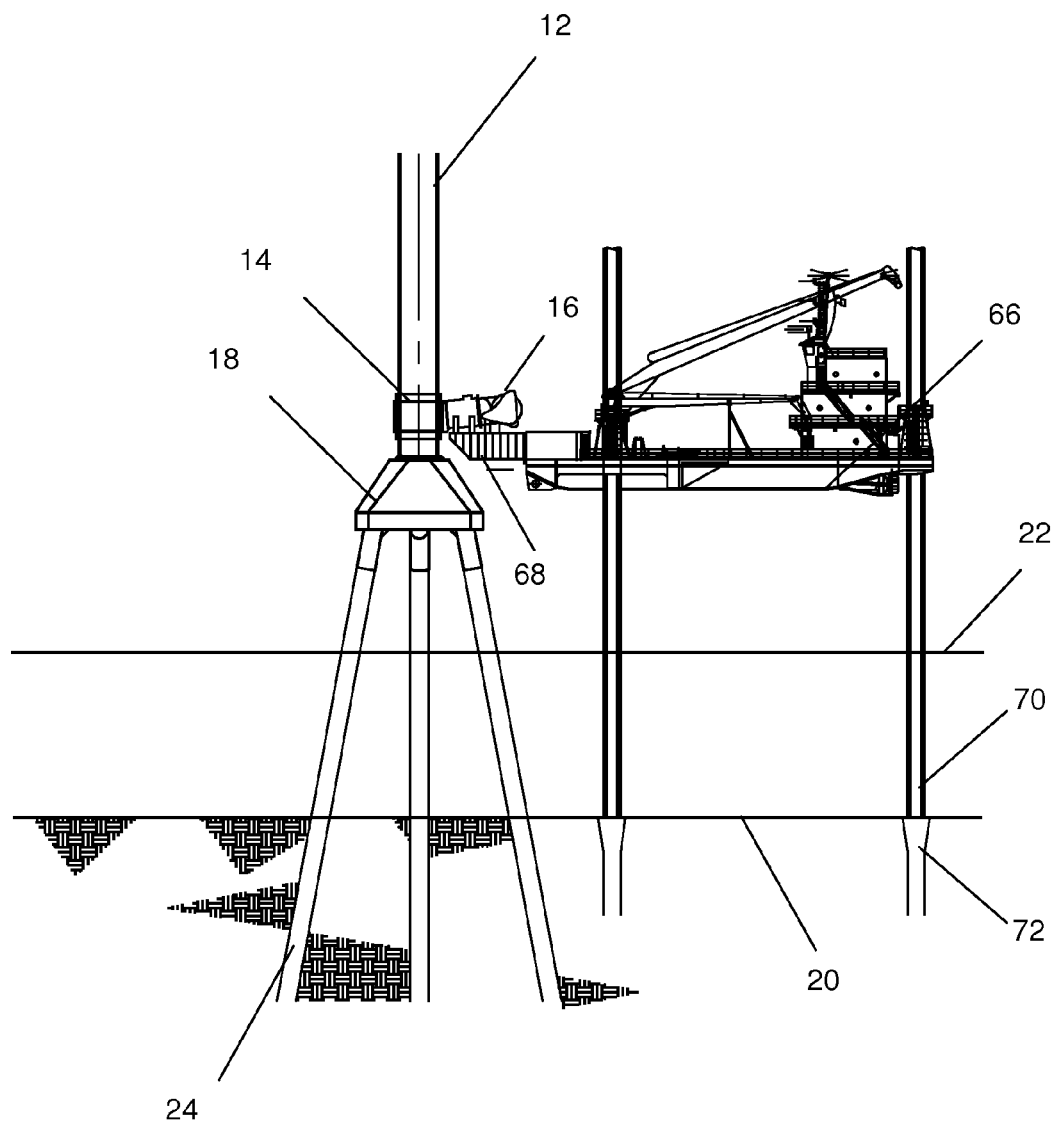
FIG. 12 illustrates a support vessel that may be used to install and/or maintain components of the system of FIG. 1, according to certain aspects of the present inventions.

Referring also to FIG. 12, a support vessel 66 is shown adjacent the tower 12, with the carriage 14 in the maintenance position. The support vessel 66 preferably includes a cantilevered deck 68, which may be retractable, to facilitate installation, and/or maintenance, of the carriage 14, wind turbine 16, and/or other components of the system 10. The support vessel 66 preferably includes a plurality of, typically three or four, jacking legs 70 to lift it, or a portion thereof, up and out of the water, above the water line 22, adjacent the carriage 14 in the maintenance position. The jacking legs 70 of the support vessel 66 may utilize pre-driven capped piles 72 embedded in the seabed 20. In one embodiment, the pre-driven capped piles 72 present a convex upwardly facing surface upon which concave downwardly facing surfaces of the jacking legs 70 may be securely landed.

The pre-driven capped piles 72 may be engineered or otherwise designed, installed, and maintained to provide reliable footing for the jacking legs 70 in a variety of seabeds. Therefore, the legs 70 may begin lifting the support vessel upon contacting the piles 72, as the legs 70 are not expected to sink into the seabed 20, as they would be without the piles 72. Thus, use of such pre-driven capped piles 72 speeds set-up of the support vessel 66. Use of such pre-driven capped piles 72 also provides a known, fixed orientation to the carriage 14 and wind turbine 16 about the tower 12, when in the maintenance position. In other words, use of such pre-driven piles 72 means that the support vessel 66 will preferably be oriented at the same azimuth with respect to the tower 12, and therefore the carriage 14 and wind turbine 16 will also preferably be oriented at the same azimuth with respect to the tower 12. Thus, the locking mechanism 42 near the bottom of the tower 12 preferably pins, locks, holds, or otherwise prevents the carriage 14 from moving about the tower 12, thereby keeping the wind turbine 16 properly oriented with any respect to the support vessel 66.

Figure 13:
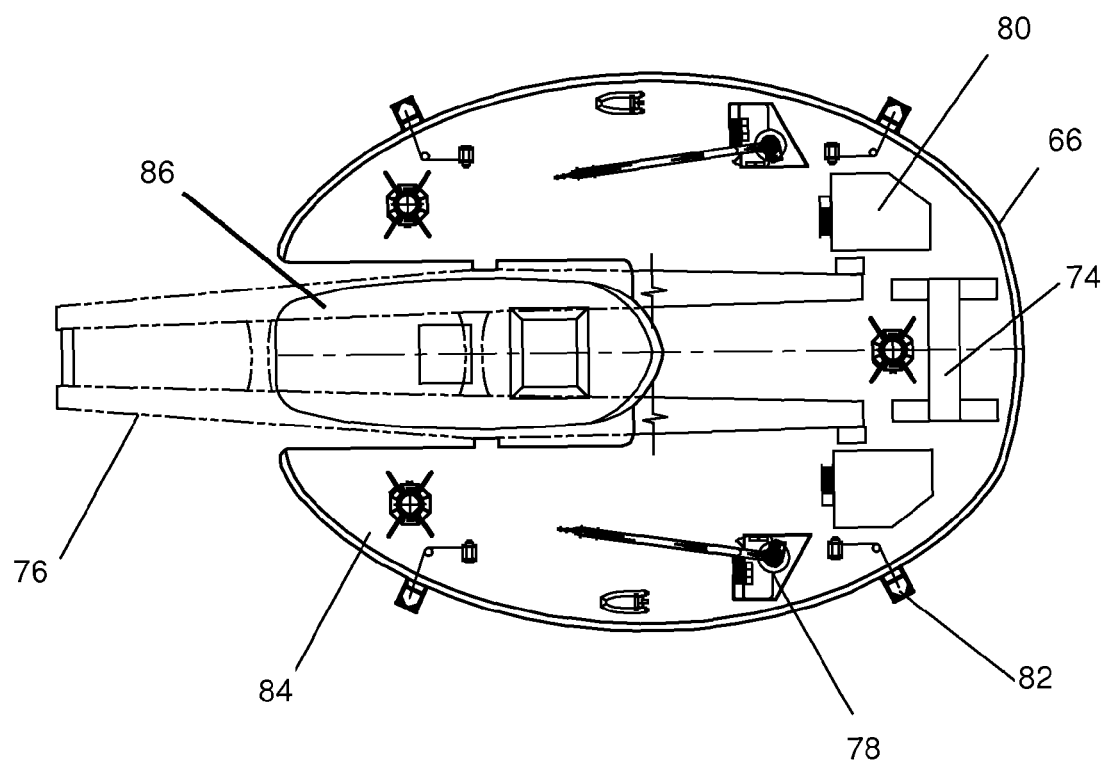
FIG. 13 illustrates a plan view of the support vessel of FIG. 12.
Figure 14:
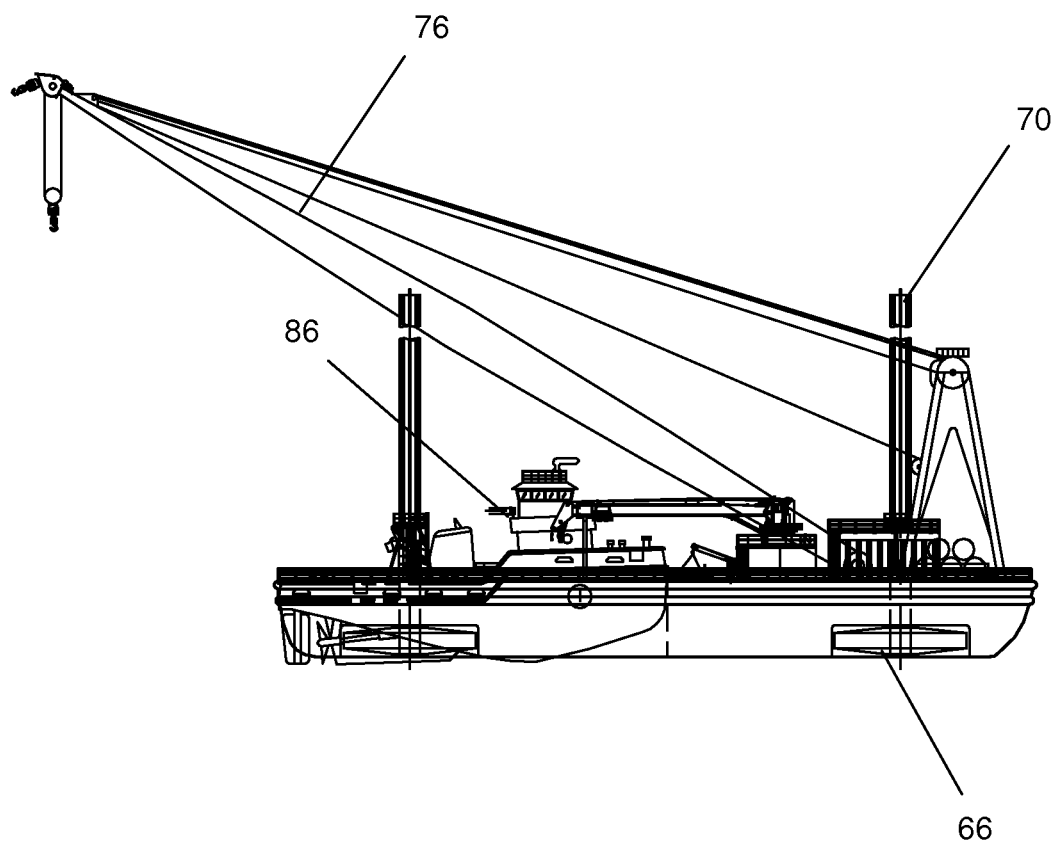
FIG. 14 illustrates an elevation view of the support vessel of FIG. 12.

Referring also the FIG. 13 and FIG. 14, the support vessel 66 may also include a winch 74 operated boom 76, various cranes 78, living quarters 80, and anchor winches 82 mounted on a work deck 84 to facilitate installation and maintenance of the carriage 14 and wind turbine 16. The support vessel 66 may include integrated propulsion or may selectively mate with a tug 86. The tug 86 may fit partially within the support vessel 66 and thereby move it from one wind power system 10 to another. In this configuration, the tug 86 may position the support vessel 66 with the legs 70 above the pre-driven piles 72, holding it there until the legs 70 contact the pre-driven piles 72, and being lifting the support vessel 66. Once the legs 70 have contacted the pre-driven piles 72, and begun lifting the support vessel 66, the tug 86 may be freed to move another support vessel 66, as the system 10 of the present invention is expected to include many towers 12, wind turbines 16, and other iterations of the above described components.

Prior art off shore wind turbine power generations systems were more susceptible to damage from storms. Furthermore, mechanical or electrical problems, whether storm related or not, typically involved such prior art systems to be out of operation for weeks. The present system 10, with the above described storm position, maintenance position, support vessel 66, and pre-driven piles 72, etc., provides a distinct advance in the art. As mentioned above, the storm position prevents and/or minimizes storm related damage in the first place. The maintenance position allows the support vessel 66 to readily access the carriage 14 and wind turbine 16 for installation and/or maintenance. The pre-driven piles 72 allow the support vessel to begin work almost immediately upon arrival at the tower 12 of the present system 10. These features protect the blades of the turbine 16 and allow them to be installed and/or replaced within a few hours. Thus, major repairs that would take weeks, with prior art systems, can be accomplished in a matter of hours, utilizing the above described features of the present invention.

Other and further embodiments utilizing one or more aspects of the inventions described above can be devised without departing from the spirit of Applicant's invention. For example, the carriage 14 is expected to include motors and brakes to move itself to, and hold itself in, any position and orientation with respect to the tower 12 as may be needed to position the wind turbine 16 into the wind for generation of electrical energy. Furthermore, the various methods and embodiments of the present invention can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range of equivalent of the following claims.

What is claimed is:

1. A wind power system comprising:
   a vertical tower defining a vertical travel path, the tower having a constant outside diameter along the travel path;
   a carriage mounted to the tower and configured to move along the travel path;
   a wind turbine mounted to the carriage and having rotatable blades to convert wind energy into electrical energy; and
   a locking mechanism configured to lock the carriage in a working position at a top of the travel path, the locking mechanism comprising a sleeve secured to the carriage and an outwardly biased peg configured to fit into an internal opening in the sleeve, thereby locking the carriage at the top of the travel path.

2. The system as set forth in claim 1, wherein the carriage surrounds the tower.

3. The system as set forth in claim 1, further including at least one gear rack secured to the outside diameter of the tower along the travel path and wherein the carriage includes an electric motor driven pinion gear that meshes with the gear rack to move the carriage along the travel path.

4. The system as set forth in claim 3, wherein the electric motor driven pinion gear is powered by alternating current.

5. The system as set forth in claim 1, further including three gear racks secured to the outside diameter of the tower along the travel path, the gear racks mounted about one hundred and twenty degrees apart around the tower, and wherein the carriage includes six electric motor driven pinion gears that mesh with the gear racks to move the carriage along the travel path.

6. The system as set forth in claim 5, wherein the electric motor driven pinion gears are powered by alternating current supplied by a separate support vessel.

7. The system as set forth in claim 1, wherein the carriage is electrically coupled with a power cable located inside the tower when in a working position at a top of the travel path of the tower, and wherein the carriage is electrically decoupled with the power cable when the carriage is not in the working position.

8. The system as set forth in claim 1, wherein the carriage is configured to rotate about the tower in order to align the wind turbine with a wind direction.

9. The system as set forth in claim 1, further including a locking mechanism configured to lock the carriage in a maintenance position at a bottom of the travel path, the locking mechanism comprising a sleeve secured to the carriage and a outwardly biased peg configured to fit into an internal opening in the sleeve, thereby locking the carriage at the bottom of the travel path.

10. The system as set forth in claim 1, further including a locking mechanism configured to lock the carriage in a storm position at a midpoint of the travel path, the locking mechanism comprising a sleeve secured to the carriage and an outwardly biased peg configured to fit into an internal opening in the sleeve, thereby locking the carriage at the midpoint of the travel path.

11. The system as set forth in claim 10, wherein the turbine is configured to hold the blades in a vertical alignment parallel to the tower, when the carriage is in the storm position.

12. A wind power system comprising:
   a vertical tower defining a vertical travel path, the tower having a constant outside diameter along the travel path and at least one gear rack secured to the outside diameter of the tower along the travel path;
   a carriage mounted about the tower and configured to selectively move along the travel path utilizing the gear rack and rotate about the tower;
   a wind turbine mounted to the carriage and having rotatable blades to convert wind energy into electrical energy; and
   wherein the tower comprises a variable internal diameter, with a wall of the tower being thinner near the top of the tower than near a bottom of the tower.

13. The system as set forth in claim 12, further including a locking mechanism configured to lock the carriage in a working position at a top of the travel path, the locking mechanism comprising a sleeve secured to the carriage and a outwardly biased peg configured to fit into an internal opening in the sleeve, thereby locking the carriage at the top of the travel path.

14. The system as set forth in claim 12, further including a locking mechanism configured to lock the carriage in a maintenance position at a bottom of the travel path, the locking mechanism comprising a sleeve secured to the carriage and an outwardly biased peg configured to fit into an internal opening in the sleeve, thereby locking the carriage at the bottom of the travel path.

15. The system as set forth in claim 12, further including a locking mechanism configured to lock the carriage in a storm position at a midpoint of the travel path, the locking mechanism comprising a sleeve secured to the carriage and an outwardly biased peg configured to fit into an internal opening in the sleeve, thereby locking the carriage at the midpoint of the travel path.

16. The system as set forth in claim 15, wherein the turbine is configured to hold the blades in a vertical alignment parallel to the tower, when the carriage is in the storm position.

\* \* \* \* \*